C. J. WOOLSON.
Hinge for Stove Doors.
No. 1,468. Reissued April 28, 1863.
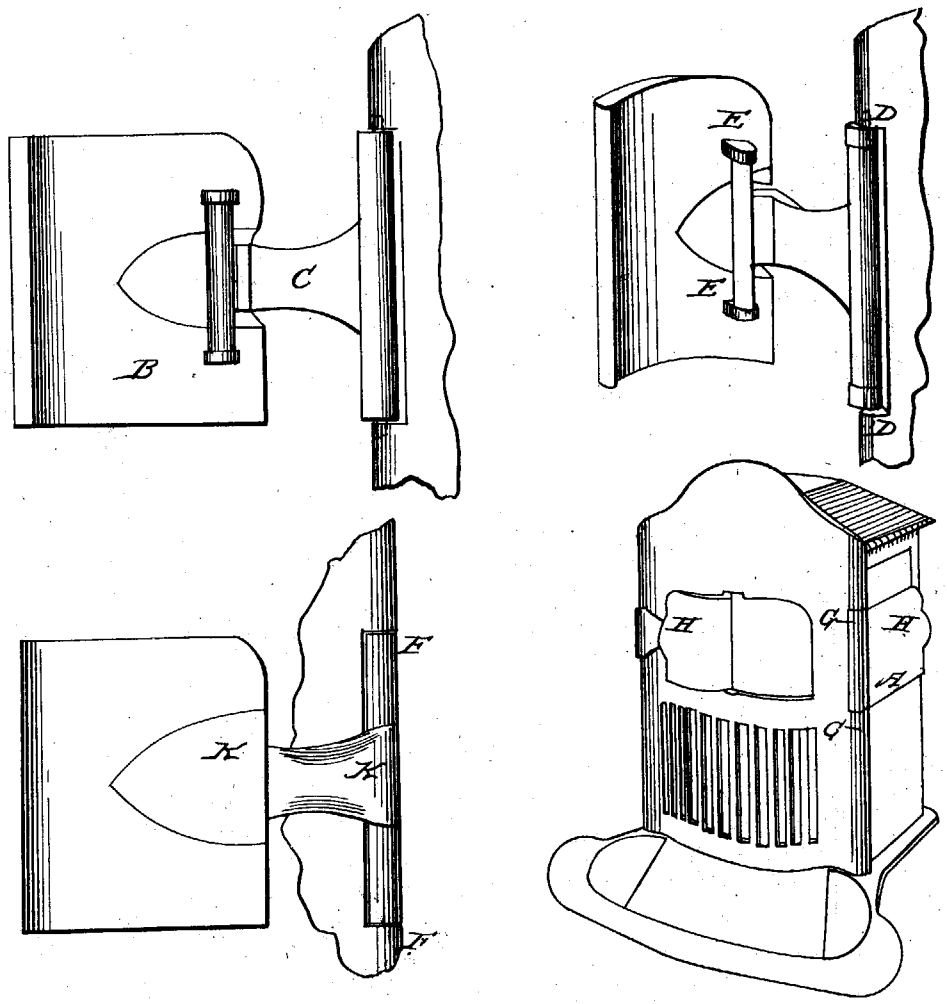
N. PETERS, Photo-Lithographer, Washington, D. C.

UNITED STATES PATENT OFFICE.

CHARLES J. WOOLSON, OF CLEVELAND, OHIO.

IMPROVEMENT IN HINGES FOR STOVE-DOORS.

Specification forming part of Letters Patent No. 8,814, dated March 16, 1852; Reissue No. 1,468, dated April 28, 1863.

*To all whom it may concern:*

Be it known that I, CHARLES J. WOOLSON, of Cleveland, in the county of Cuyahoga and State of Ohio, have invented a new and Improved Mode of Hanging the Doors of Stoves and Grates; and I hereby declare that the following is a full and exact description of the same, reference being had to the accompanying drawings, making a part of this specification, in which—

Figure 1 is a perspective view of the stove with my improvement attached. Fig. 2 is a view of the door and hinge detached from the stove. Figs. 3 and 4 are back views of Fig. 2.

Like letters denote the same parts in the several views.

The nature of my invention consists in an improved mode of arranging the front and doors of a stove or grate in a practical and simple manner, so that the advantage of an open or of a close stove may be enjoyed, while the beauty and convenience is in either case preserved, the concealment of the hinges, both when the doors are opened and closed, and the swinging around to the side and folding them compactly out of the way. To effect this object I hang the door or doors upon the outer and back side edge of the front of the stove by a double or compound hinge formed by introducing an arm or supporter, by means of which the door may be swung from the opening in the front of the fire-place (which it is made to close) entirely away from the front and around to the side of the stove, where it folds into place, as seen at A in Fig. 1. The arm is attached to the front of the stove by lugs or ears upon the back side, as represented at D D in Fig. 4. The arm is seen at C, the door at B, and the attachment between them at E E, the lugs or ears and working part of the hinge being concealed from view in front of the stove both when the doors are opened and when closed, as represented at H H, Fig. 1, and K K, Fig. 2. The upright portion of the arm fits into and forms part of the front when the door is closed, as seen at F F. When the door is opened, the front edge of the same falls into and fills the opening in the front left by the turning out of the upright portion of the hinge, as seen at G G in Fig. 1. One, two, or more doors may be used in closing the front with my arrangement, as the use of the stove or convenience may require; or this mode of closing a portion of the front may be used in combination with a sliding register, as seen in the drawings and model, or in any other manner of closing part of the front that may be desired.

It will be seen that by this improvement I succeed in furnishing an open or closed stove at will by a simple arrangement of a front-door hinge, whereby all appearances of hinges, soot, ashes, &c., are effectually concealed from view.

What I claim as my invention, and desire to secure by Letters Patent, is—

Hanging the doors, by a double or compound hinge attached to the inside of them and to the outer edge of the front of Franklin stoves and grates, so that all the connecting parts of the hinges are concealed from view when the doors are closed, permitting them to be fully opened and swung away from the front and around to the sides or ends of the stove, and there folded compactly into place again, concealing the connecting-hinges, as herein set forth.

CHARLES J. WOOLSON.

Witnesses:

W. H. BURRIDGE,

HENRY VOTH.